(12) United States Patent
Norman

(10) Patent No.: US 7,852,908 B1
(45) Date of Patent: Dec. 14, 2010

(54) COMBINED DIGITAL FILTER AND CORRELATOR

(75) Inventor: Charles Norman, Huntington Beach, CA (US)

(73) Assignee: RF Micro Devices, Inc., Greensboro, NC (US)

( * ) Notice: Subject to any disclaimer, the term of this patent is extended or adjusted under 35 U.S.C. 154(b) by 761 days.

(21) Appl. No.: 11/760,221

(22) Filed: Jun. 8, 2007

(51) Int. Cl.
*H04B 1/00* (2006.01)

(52) U.S. Cl. .................. 375/150; 375/343; 375/350

(58) Field of Classification Search .......... 375/140, 375/142, 144, 148, 150, 343, 350
See application file for complete search history.

(56) References Cited

U.S. PATENT DOCUMENTS

| | | | |
|---|---|---|---|
| 5,852,630 A * | 12/1998 | Langberg et al. ............ | 375/219 |
| 6,236,354 B1 | 5/2001 | Krasner | |
| 6,282,231 B1 | 8/2001 | Norman et al. | |
| 6,466,161 B2 | 10/2002 | Turetzky et al. | |
| 6,529,829 B2 | 3/2003 | Turetzky et al. | |
| 6,680,695 B2 | 1/2004 | Turetzky et al. | |
| 6,707,423 B2 | 3/2004 | Turetzky et al. | |
| 6,738,013 B2 | 5/2004 | Orler et al. | |
| 6,747,596 B2 | 6/2004 | Orler et al. | |
| 7,026,986 B2 | 4/2006 | Turetzky et al. | |
| 7,106,786 B2 | 9/2006 | Turetzky et al. | |
| 7,113,552 B1 | 9/2006 | Norman et al. | |
| 7,116,704 B2 | 10/2006 | Norman et al. | |
| 7,127,351 B2 | 10/2006 | Norman et al. | |
| 7,132,978 B2 | 11/2006 | Orler et al. | |
| 7,151,485 B2 | 12/2006 | Orler et al. | |
| 7,183,972 B2 | 2/2007 | Turetzky et al. | |
| 7,197,305 B2 | 3/2007 | Turetzky et al. | |
| 7,246,011 B2 | 7/2007 | Norman et al. | |
| 7,365,680 B2 | 4/2008 | Turetzky et al. | |
| 2007/0058696 A1* | 3/2007 | Dempster et al. ........... | 375/148 |
| 2008/0205492 A1* | 8/2008 | Gorday et al. .............. | 375/150 |

\* cited by examiner

*Primary Examiner*—Shuwang Liu
*Assistant Examiner*—David Huang
(74) *Attorney, Agent, or Firm*—Withrow & Terranova, P.L.L.C.

(57) ABSTRACT

The present invention is a combined digital filter and correlator, which is used in a radio frequency (RF) receiver, and takes advantage of common structures used in both digital filters and correlators. Specifically, a digital filter may mix (multiply) digital filter coefficients with samples of a down-converted RF signal, and then sum the resulting products to provide filtered samples of the down-converted RF signal. Similarly, a correlator may mix (multiply) a reference code with the samples of the down-converted RF signal, and then sum the resulting products to provide a correlation of the down-converted RF signal. The present invention combines the digital filter coefficients and the reference code into a modified reference code, which is then mixed with the samples of the down-converted RF signal and summed to provide a filtered correlation of the down-converted RF signal.

27 Claims, 8 Drawing Sheets

COMBINED DIGITAL FILTER AND CORRELATOR

This application claims the benefit of provisional patent application Ser. No. 60/913,468, filed Apr. 23, 2007, and provisional patent application Ser. No. 60/916,962, filed May 9, 2007, the disclosures of which are hereby incorporated by reference in their entireties.

FIELD OF THE INVENTION

The present invention relates to radio frequency (RF) receivers that sample and correlate a received RF signal using a reference code.

BACKGROUND OF THE INVENTION

RF receivers often use correlators to correlate a code in a received RF signal with a reference code. Once the received code is correlated with the reference code, other information in the received signal may be extracted. The other information may be used in applications associated with equipment containing the RF receiver, such as a Global Positioning System (GPS) receiver, a navigation system receiver, or the like. In some applications, the reference code may be a frequency spreading code that is used in a direct sequence spread spectrum (DSSS) system. In a DSSS system, an RF transmitter sends data using a modulated RF signal. A bit sequence having a higher rate than a data rate may incorporate the frequency spreading code to spread the frequency content of the modulated RF signal, and may incorporate redundancy in the transmitted data.

Some RF receivers may receive desired RF signals in the presence of interfering signals, which may be continuous wave (cw) interfering signals, modulated interfering signals, or interfering signals having embedded correlation codes. Some signals, such as GPS signals from satellites, may have Doppler frequency shifts. In a GPS system, a GPS receiver may be receiving desired RF signals from some GPS satellites in the presence of stronger RF signals from interfering satellites. Therefore, filtering may be required to remove the effects of interfering signals. Thus, there is a need to both filter RF signals to remove interference and to correlate a reference code with a desired RF signal.

SUMMARY OF THE INVENTION

The present invention is a combined digital filter and correlator, which is used in a radio frequency (RF) receiver, and takes advantage of common structures used in both digital filters and correlators. Specifically, a digital filter may mix (multiply) digital filter coefficients with samples of a down-converted RF signal, and then sum the resulting products to provide filtered samples of the down-converted RF signal. Similarly, a correlator may mix (multiply) a reference code with the samples of the down-converted RF signal, and then sum the resulting products to provide a correlation of the down-converted RF signal. The present invention combines the digital filter coefficients and the reference code into a modified reference code, which is then mixed with the samples of the down-converted RF signal and summed to provide a filtered correlation of the down-converted RF signal. Correlating and filtering using the modified reference code may be processed using no more digital resources than correlating using the reference code; therefore, correlation filtering may be added with little or no processing penalty.

In one embodiment of the present invention, a Global Positioning System (GPS) receiver receives desired signals from multiple GPS satellites to determine the location of the GPS receiver. Local transmitters, interfering satellites, or both, may be transmitting signals that interfere with reception of the desired signals; therefore, a modified reference code may be used to reduce effects of the interfering signals. The modified reference code may be generated by iteratively testing different modifications of the reference code that do not degrade correlations with desired satellite signals below a specified threshold, by measuring the frequency content of at least one interfering signal and modifying the reference code to cancel some or all of the interfering frequencies, by using other sources of information regarding the frequency content of the interfering signal and modifying the reference code to cancel some or all of the interfering frequencies, by correlating a sampled RF signal with an interfering signal from at least one interfering satellite and modifying the reference code to reduce the correlation from the interfering satellite, by using other sources of information regarding an interfering signal from at least one interfering satellite and modifying the reference code to reduce the correlation from the interfering satellite, or any combination thereof.

Alternatively, the modified reference code may be generated by multiplying the reference code with digital filter coefficients from a digital filter, which may filter out frequencies of interfering signals. The digital filter may include a finite impulse response (FIR) filter. Fast Fourier transform (FFT) circuitry may be used to measure the frequency content of interfering signals. The reference code may be a frequency spreading code that may be used in a direct sequence spread spectrum (DSSS) system, such as a GPS system. The reference code may be a pseudo random noise (PRN) code to spread the frequency of transmitted signals to appear as pseudo random noise, the reference code may be a GPS coarse acquisition (C/A) code, or both.

Those skilled in the art will appreciate the scope of the present invention and realize additional aspects thereof after reading the following detailed description of the preferred embodiments in association with the accompanying drawing figures.

BRIEF DESCRIPTION OF THE DRAWING FIGURES

The accompanying drawing figures incorporated in and forming a part of this specification illustrate several aspects of the invention, and together with the description serve to explain the principles of the invention.

DETAILED DESCRIPTION OF THE PREFERRED EMBODIMENTS

Figure 1:
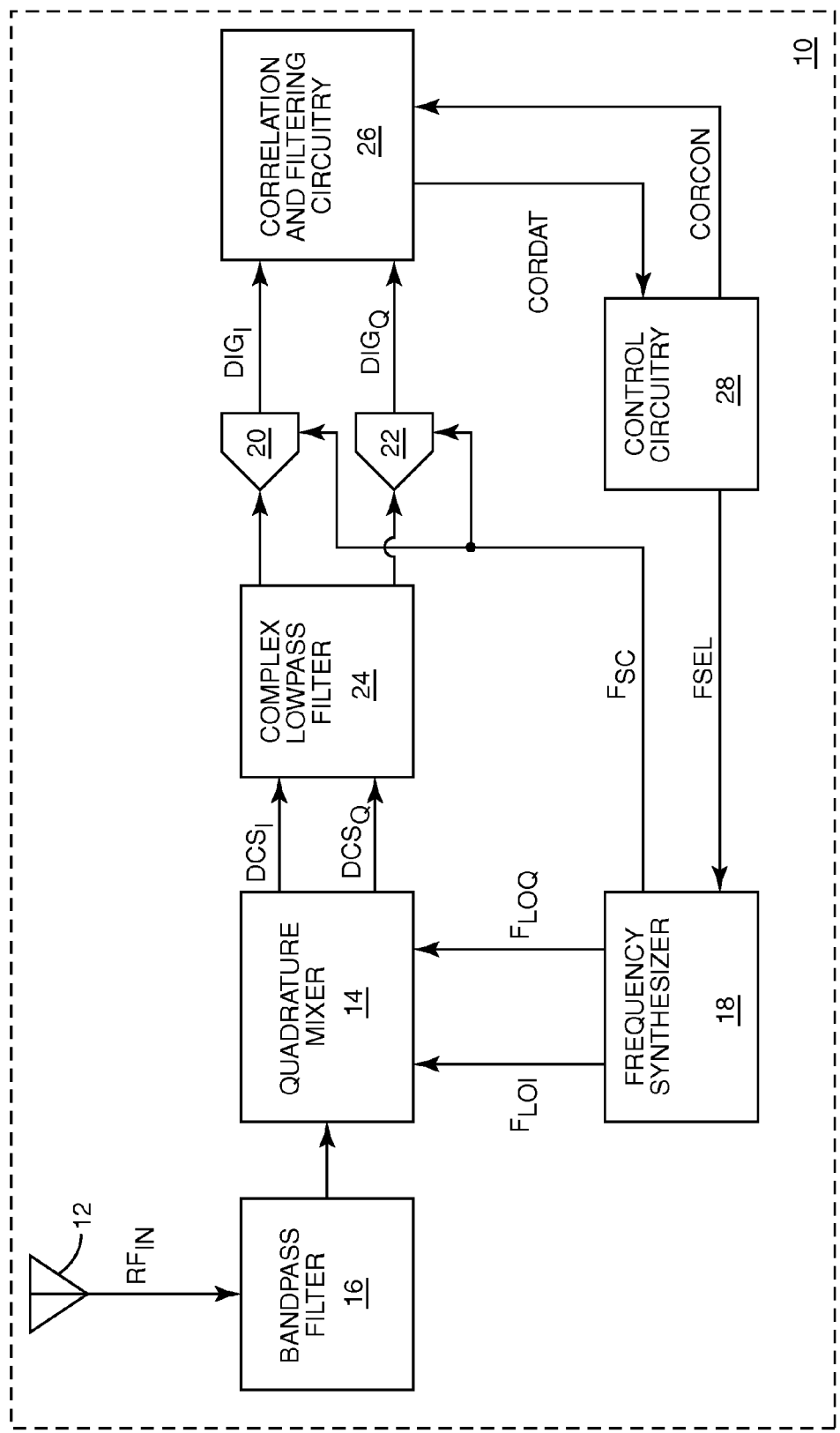
FIG. 1 shows an RF receiver.

The embodiments set forth below represent the necessary information to enable those skilled in the art to practice the invention and illustrate the best mode of practicing the invention. Upon reading the following description in light of the accompanying drawing figures, those skilled in the art will understand the concepts of the invention and will recognize applications of these concepts not particularly addressed herein. It should be understood that these concepts and applications fall within the scope of the disclosure and the accompanying claims.

The present invention is a combined digital filter and correlator, which is used in an RF receiver, and takes advantage of common structures used in both digital filters and correlators. Specifically, a digital filter may mix (multiply) digital filter coefficients with samples of a down-converted RF signal, and then sum the resulting products to provide filtered samples of the down-converted RF signal. Similarly, a correlator may mix (multiply) a reference code with the samples of the down-converted RF signal, and then sum the resulting products to provide a correlation of the down-converted RF signal. The present invention combines the digital filter coefficients and the reference code into a modified reference code, which is then mixed with the samples of the down-converted RF signal and summed to provide a filtered correlation of the down-converted RF signal. Correlating and filtering using the modified reference code may be processed using no more digital resources than correlating using the reference code; therefore, correlation filtering may be added with little or no processing penalty.

In one embodiment of the present invention, a Global Positioning System (GPS) receiver receives desired signals from multiple GPS satellites to determine the location of the GPS receiver. Local transmitters, interfering satellites, or both, may be transmitting signals that interfere with reception of the desired signals; therefore, a modified reference code may be used to reduce effects of the interfering signals. The modified reference code may be generated by iteratively testing different modifications of the reference code that do not degrade correlations with desired satellite signals below a specified threshold, by measuring the frequency content of at least one interfering signal and modifying the reference code to cancel some or all of the interfering frequencies, by using other sources of information regarding the frequency content of the interfering signal and modifying the reference code to cancel some or all of the interfering frequencies, by correlating a sampled RF signal with an interfering signal from at least one interfering satellite and modifying the reference code to reduce the correlation from the interfering satellite, by using other sources of information regarding an interfering signal from at least one interfering satellite and modifying the reference code to reduce the correlation from the interfering satellite, or any combination thereof.

Alternatively, the modified reference code may be generated by multiplying the reference code with digital filter coefficients from a digital filter, which may filter out frequencies of interfering signals. The digital filter may include a finite impulse response (FIR) filter, which may be a notch filter having at least one notch frequency, a bandpass filter, a bandstop filter, a highpass filter, a lowpass filter, or any combination thereof. Fast Fourier transform (FFT) circuitry may be used to measure the frequency content of interfering signals.

The reference code may be a frequency spreading code that may be used in a direct sequence spread spectrum (DSSS) system, such as a GPS system. The reference code may be a pseudo random noise (PRN) code to spread the frequency of transmitted signals to appear as pseudo random noise, the reference code may be a GPS coarse acquisition (C/A) code, or both.

FIG. 1 shows an RF receiver 10. A receiving antenna 12 receives radiated RF signals and provides an RF input signal $RF_{IN}$ to a quadrature mixer 14 through a bandpass filter 16, which removes out-of-band signals. The quadrature mixer 14 mixes the filtered RF input signal $RF_{IN}$ with an in-phase local oscillator signal $F_{LOI}$ and a quadrature-phase local oscillator signal $F_{LOQ}$ to provide an in-phase down-converted signal $DCS_I$ and a quadrature-phase down-converted signal $DCS_Q$. A frequency synthesizer 18 provides the in-phase and quadrature-phase local oscillator signals $F_{LOI}$, $F_{LOQ}$. The in-phase and quadrature-phase down-converted signals $DCS_I$, $DCS_Q$ feed an in-phase analog-to-digital converter (ADC) 20 and a quadrature-phase ADC 22 through a complex lowpass filter 24, which further reduces interfering signals. The frequency synthesizer 18 provides a sampling clock $F_{SC}$ to the in-phase and quadrature-phase ADCs 20, 22. The in-phase and quadrature-phase ADCs 20, 22 sample the in-phase and quadrature-phase down-converted signals $DCS_I$, $DCS_Q$ to provide an in-phase digital signal $DIG_I$ and a quadrature-phase digital signal $DIG_Q$ to correlation and filtering circuitry 26, which correlates the in-phase and quadrature-phase digital signals $DIG_I$, $DIG_Q$ with a modified first reference code to provide a filtered correlation. Control circuitry 28 provides a frequency select signal FSEL to the frequency synthesizer 18 to select the frequency of the in-phase and quadrature-phase local oscillator signals $F_{LOI}$, $F_{LOQ}$. The control circuitry 28 receives correlation data CORDAT from and provides correlation control information CORCON to the correlation and filtering circuitry 26. The RF input signal $RF_{IN}$ may include a direct sequence spread spectrum (DSSS) signal, a GPS signal, or both.

Figure 2:
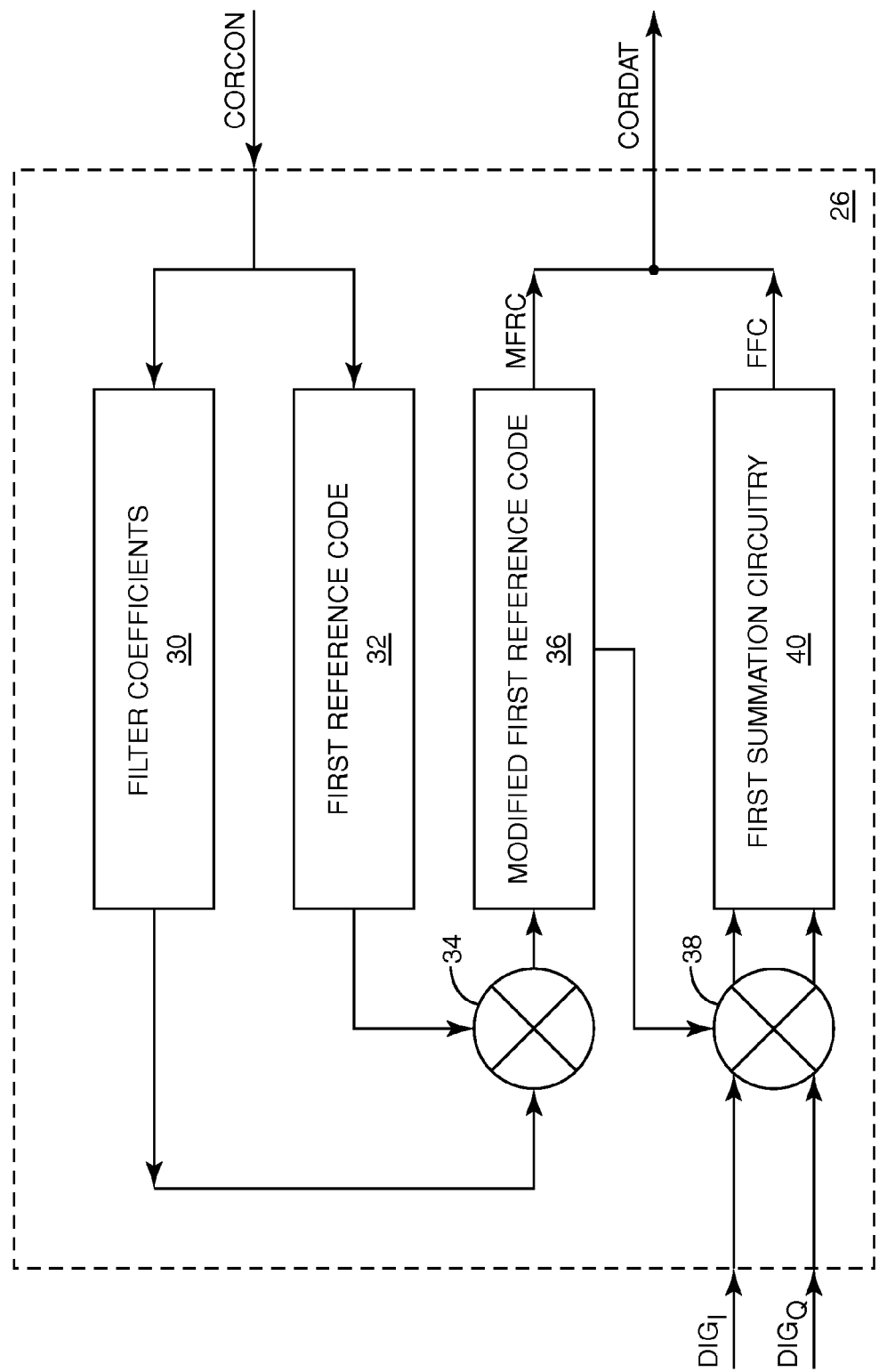
FIG. 2 shows details of the correlation and filtering circuitry illustrated in FIG. 1, according to one embodiment of the present invention.

FIG. 2 shows details of the correlation and filtering circuitry 26 illustrated in FIG. 1, according to one embodiment of the present invention. The correlation and filtering circuitry 26 may include computer processing circuitry, which may include one or more digital signal processors (DSPs). Some or all of the functions of the correlation and filtering circuitry 26 may be provided by executing software instructions. Filter coefficients 30 are combined with a first reference code 32 using a reference code combiner 34 to provide a modified first reference code 36, which will be used to simultaneously filter and correlate with the in-phase and quadrature-phase digital signals $DIG_I$, $DIG_Q$. In the embodiment shown, the in-phase and quadrature-phase digital signals $DIG_I$, $DIG_Q$ are direct conversion signals, which are completely demodulated. The modified first reference code 36 is mixed with the in-phase and quadrature-phase digital signals $DIG_I$, $DIG_Q$ using a correlation mixer 38, which feeds first summation circuitry 40. The first summation circuitry 40 sums all of the mixing products from the correlation mixer 38 to provide a first filtered correlation FFC. The modified first reference code MFRC and the first filtered correlation FFC provide the correlation data CORDAT to the control circuitry 28. The correlation control information CORCON provides the filter coefficients 30 and the first reference code 32. The first reference code 32 may be a frequency spreading code, a pseudo random noise (PRN) code, a GPS coarse acquisition (C/A) code, or any combination thereof.

Figure 3:
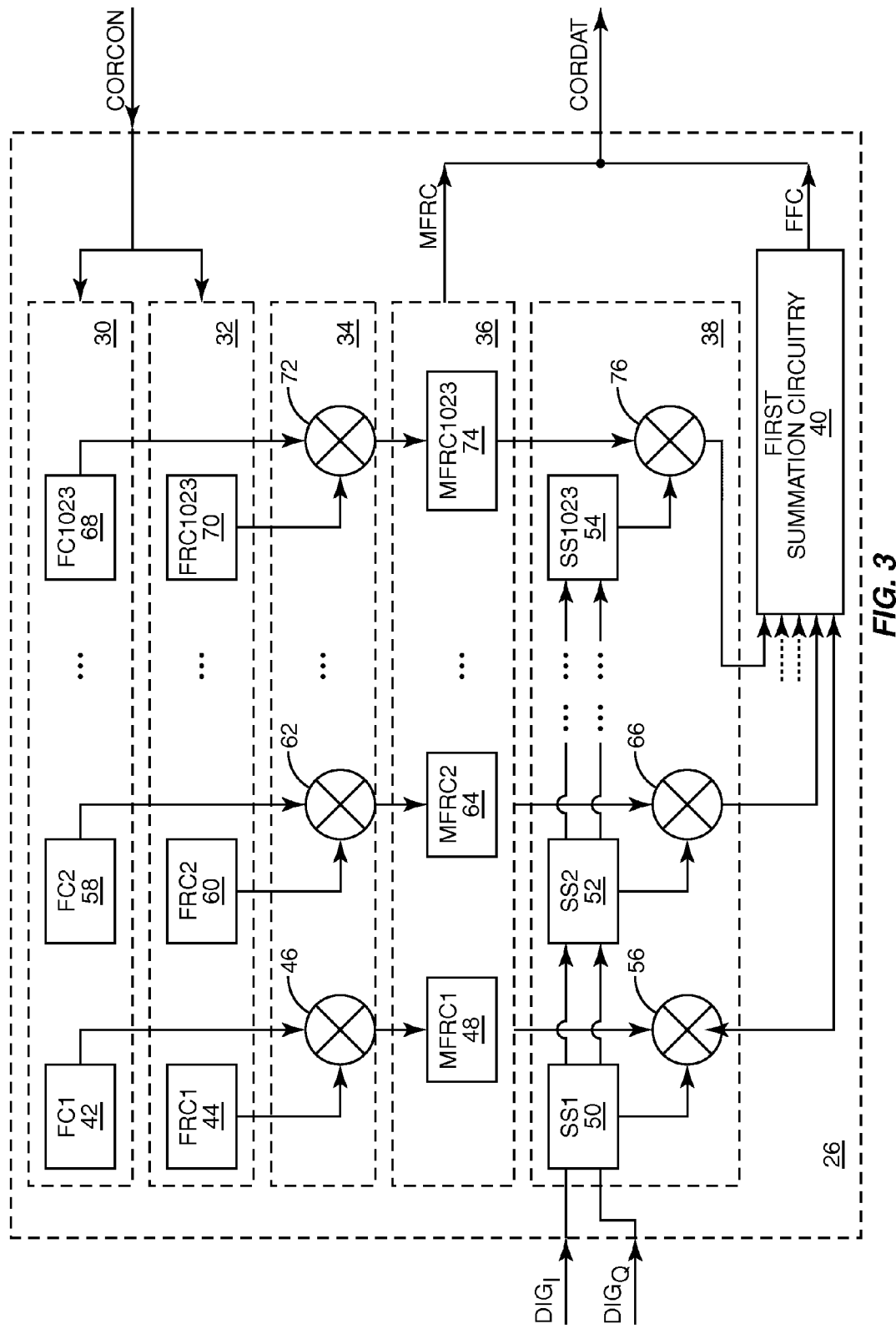
FIG. 3 shows details of the filter coefficients, the first reference code, the reference code mixer, the modified first reference code, and the correlation mixer illustrated in FIG. 2.

FIG. 3 shows details of the filter coefficients 30, the first reference code 32, the reference code combiner 34, the modified first reference code 36, and the correlation mixer 38 illustrated in FIG. 2. The filter coefficients 30 may be used to provide a number of different digital filters, such as FIR filters. A first filter coefficient (FC1) 42 is mixed with a first bit first reference code (FRC1) 44 using a first bit reference code mixer 46, which provides a first element first modified reference code (MFRC1) 48. The in-phase and quadrature-phase digital signals $DIG_I$, $DIG_Q$ feed a first shift register (SS1) 50, which feeds a second shift register (SS1) 52, which feeds subsequent shift registers, which feed a last shift register (SS1023) 54. The first element first modified reference code 48 is mixed with the contents of the first shift register 50 using a first modified first reference code mixer 56, which feeds the first summation circuitry 40. Similarly, a second filter coefficient (FC2) 58 is mixed with a second bit first reference code (FRC2) 60 using a second bit reference code mixer 62, which provides a second element first modified reference code (MFRC2) 64. The second element first modified reference code 64 is mixed with the contents of the second shift register 52 using a second modified first reference code mixer 66, which feeds the first summation circuitry 40. Subsequent bits of the first reference code 32 are processed similarly until a last filter coefficient (FC1023) 68 is mixed with a last bit first reference code (FRC1023) 70 using a last bit reference code mixer 72, which provides a last element first modified reference code (MFRC1023) 74. The last element first modified reference code 74 is mixed with the contents of the last shift register 54 using a last modified first reference code mixer 76, which feeds the first summation circuitry 40. In one embodiment of the present invention, the first reference code 32 may be used with a GPS signal and contain 1,023 bits; therefore, digital filters having 1023 filter coefficients may be used. Alternate embodiments of the present invention may use first reference codes and filter coefficients having any number of bits.

Figure 4:
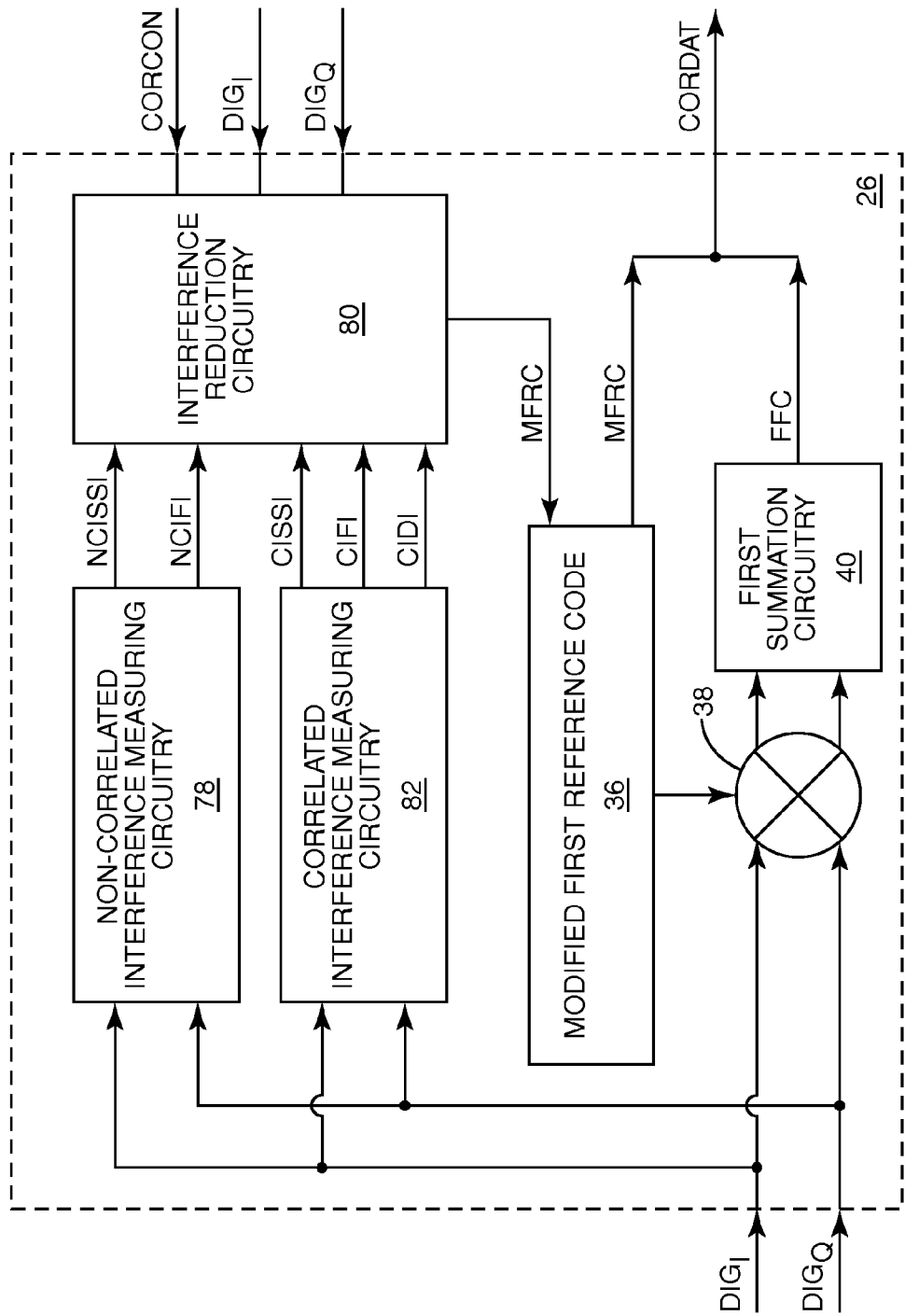
FIG. 4 shows details of the correlation and filtering circuitry illustrated in FIG. 1, according an alternate embodiment of the present invention.

FIG. 4 shows details of the correlation and filtering circuitry 26 illustrated in FIG. 1, according an alternate embodiment of the present invention. Instead of using filter coefficients 30 as illustrated in FIGS. 2 and 3, interference signals are measured and used to provide the modified first reference code 36. Non-correlated interference measuring circuitry 78 receives the in-phase and quadrature-phase digital signals $DIG_I$, $DIG_Q$ to measure non-correlated interference, and provides non-correlated interference signal strength information NCISSI and non-correlated interference frequency information NCIFI to interference reduction circuitry 80. Correlated interference measuring circuitry 82 receives the in-phase and quadrature-phase digital signals $DIG_I$, $DIG_Q$ to measure correlated interference and provides correlated interference signal strength information CISSI, correlated interference frequency information CIFI, and correlated interference delay information CIDI to the interference reduction circuitry 80, which uses the non-correlated and the correlated interference information to update the modified first reference code MFRC. Non-correlated interference signals may be continuous wave (cw) signals or modulated signals. Correlated interference signals have embedded correlation codes, which may be used by the correlated interference measuring circuitry 82 to correlate and extract signal strength information, frequency information, delay information, or any combination thereof, from the correlated interference signals. In a GPS system, the RF receiver may receive GPS signals from multiple satellites; however, signals from some of the satellites may be used by the RF receiver 10 to implement GPS functions, while signals from other satellites may interfere with signal reception. For those interfering satellites, correlating with their transmitted signals may provide useful information to create a modified first reference code MFRC that is effective in reducing the impact of such interference signals. Such information may include signal strength information, delay information, and frequency information, which may change due to a Doppler frequency shift resulting from the orbital position of the interfering satellites relative to the RF receiver 10.

Figure 5:
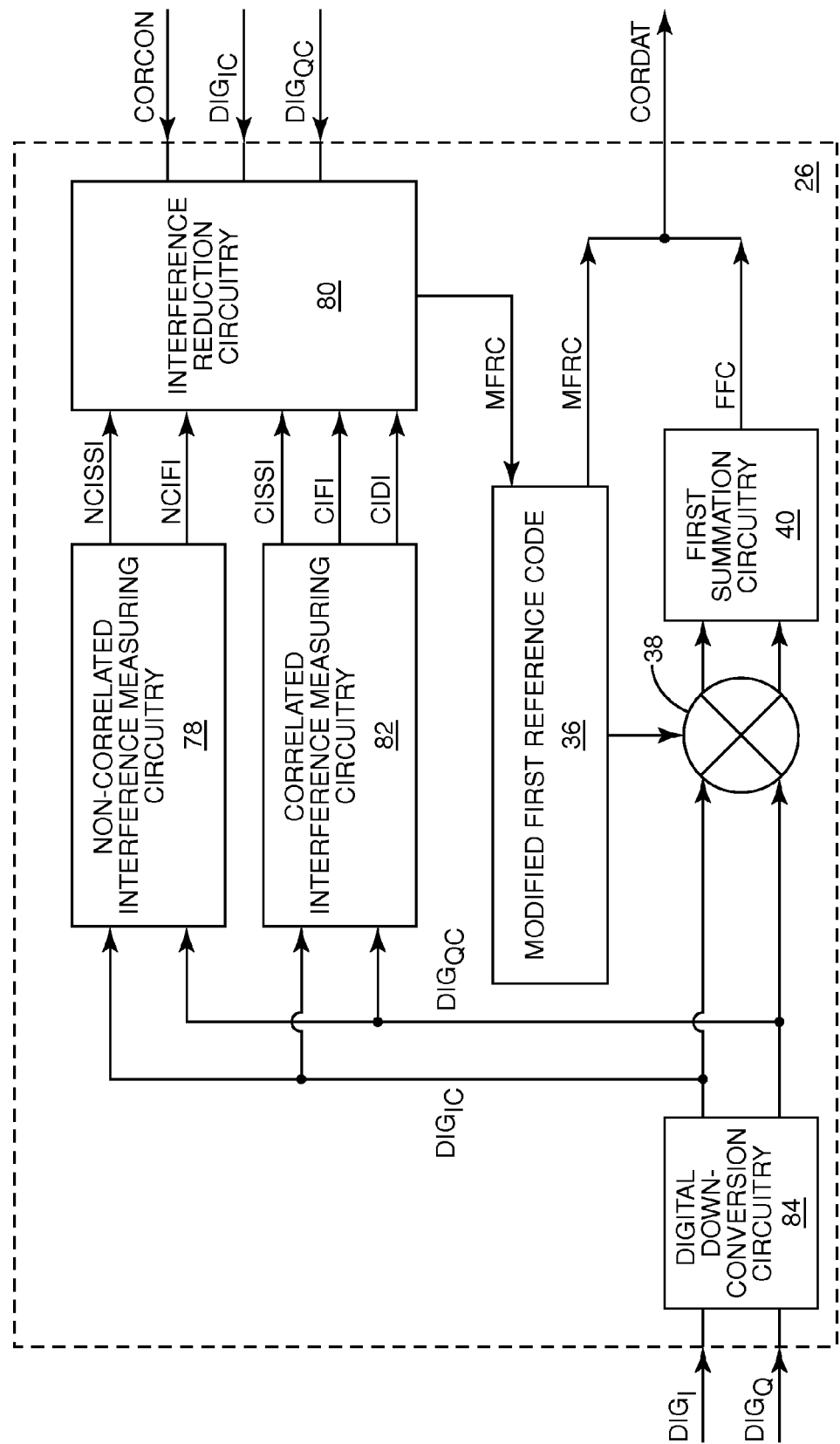
FIG. 5 shows details of the correlation and filtering circuitry illustrated in FIG. 1, according an additional embodiment of the present invention.

FIG. 5 shows details of the correlation and filtering circuitry 26 illustrated in FIG. 1, according an additional embodiment of the present invention. The in-phase and quadrature-phase digital signals $DIG_I$, $DIG_Q$ are intermediate frequency (IF) signals, which must be further down-converted to extract the modulation data; therefore, the in-phase and quadrature-phase digital signals $DIG_I$, $DIG_Q$ feed digital down-conversion circuitry 84, which provides an in-phase digital down-converted signal $DIG_{IC}$ and a quadrature-phase digital down-converted signal $DIG_{QC}$ to the correlation mixer 38, the non-correlated interference measuring circuitry 78, the correlated interference measuring circuitry 82, and the interference reduction circuitry 80. The in-phase and quadrature-phase digital down-converted signals $DIG_{IC}$, $DIG_{QC}$ are baseband signals.

Figure 6:
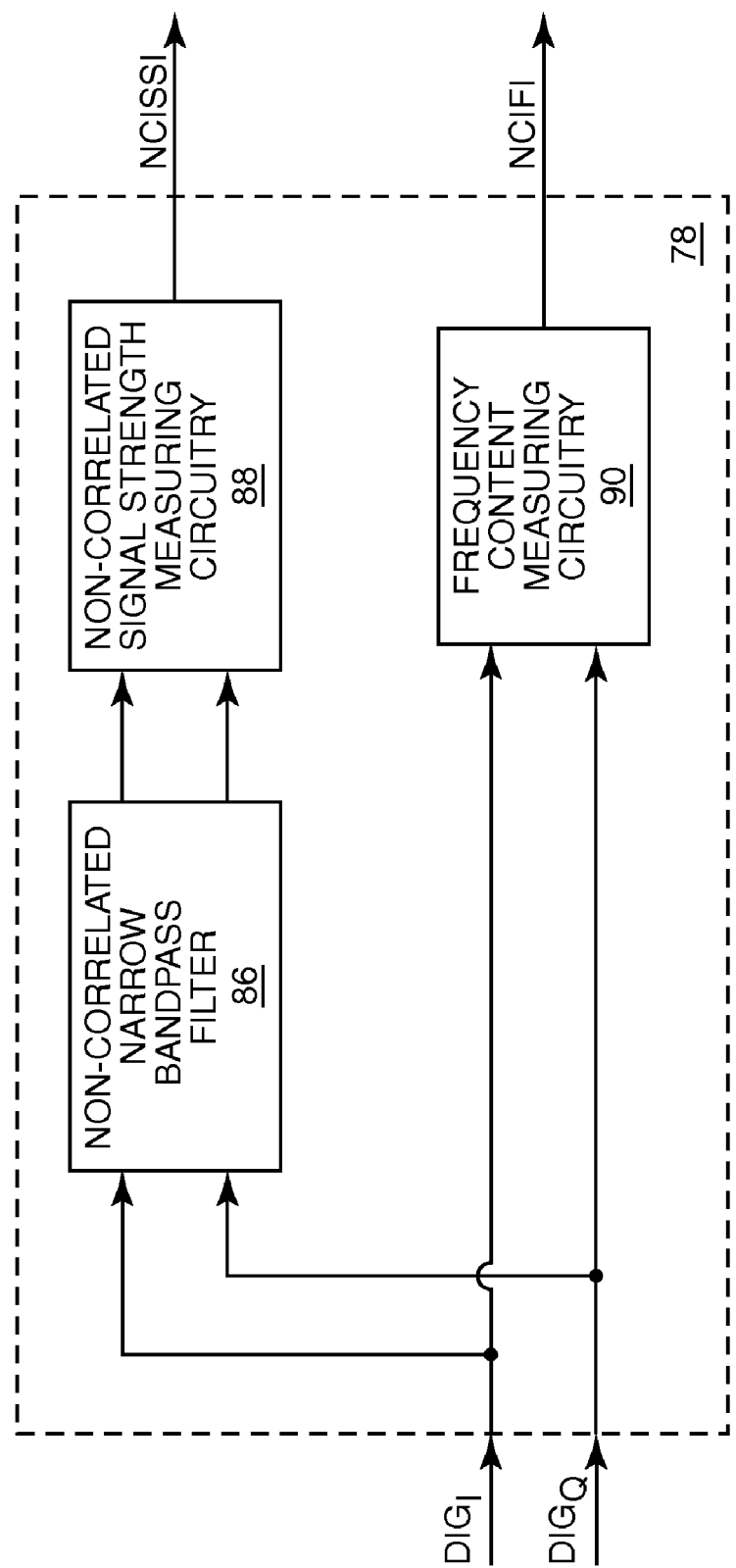
FIG. 6 shows details of the non-correlated interference circuitry illustrated in FIG. 4.

FIG. 6 shows details of the non-correlated interference measuring circuitry 78 illustrated in FIG. 4. A non-correlated narrow bandpass filter 86 receives the in-phase and quadrature-phase digital signals $DIG_I$, $DIG_Q$ and removes signals outside of a narrow passband to focus on a single RF signal or narrow range of RF signals. The non-correlated narrow bandpass filter 86 provides filtered in-phase and quadrature-phase digital signals to non-correlated signal strength measuring circuitry 88, which measures the signal strength of the RF signals of interest. The non-correlated signal strength measuring circuitry 88 provides the non-correlated interference signal strength information NCISSI to the interference reduction circuitry 80. Frequency content measuring circuitry 90 receives the in-phase and quadrature-phase digital signals $DIG_I$, $DIG_Q$ to characterize the frequency content of non-correlated interference signals, which may be based on the center frequency of the non-correlated narrow bandpass filter 86. The frequency content measuring circuitry 90 provides the non-correlated interference frequency information to the interference reduction circuitry 80. The frequency content measuring circuitry 90 may perform a fast Fourier transform (FFT) on the in-phase and quadrature-phase digital signals $DIG_I$, $DIG_Q$. The frequency content measuring circuitry 90 may isolate and measure individual RF signals using a number of bandpass filters, which may be implemented using an FFT. The non-correlated narrow bandpass filter 86 and the frequency content measuring circuitry 90 may use a number of different digital filters, including discrete Fourier transform filters, automatic frequency control filters, individual bandpass filters, and the like.

Figure 7:
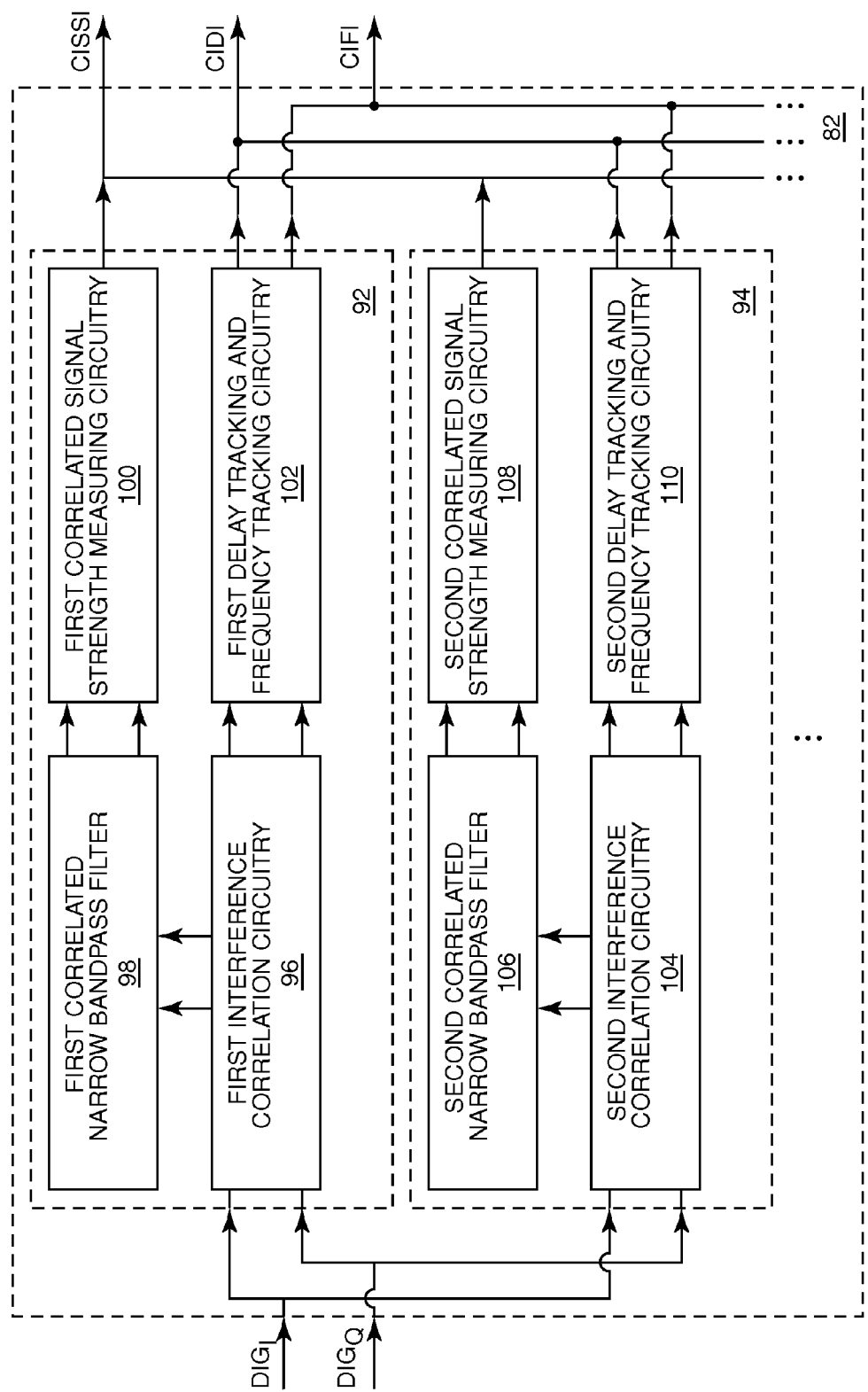
FIG. 7 shows details of the correlated interference circuitry illustrated in FIG. 4.

FIG. 7 shows details of the correlated interference measuring circuitry 82 illustrated in FIG. 4. The correlated interference measuring circuitry 82 may include a correlating interfering signal circuit for each correlating interfering signal to be characterized. FIG. 7 shows a first correlating interfering signal circuit 92 and a second correlating interfering signal circuit 94; however, any number of correlating interfering signal circuits may be used. First interference correlation circuitry 96 receives the in-phase and quadrature-phase digital signals $DIG_I$, $DIG_Q$ and uses a reference code to correlate with the correlating interfering signal of interest. A first correlated narrow bandpass filter 98 receives the correlation and removes all signals other than the correlating interfering signal of interest. The first correlated narrow bandpass filter 98 provides filtered correlated in-phase and quadrature-phase digital signals to first correlated signal strength measuring circuitry 100, which measures the signal strength of the correlating interfering signal of interest. First delay tracking and frequency tracking circuitry 102 are used to accurately measure the arrival time and the frequency of the correlating interfering signal of interest. Similarly to the first correlating interfering signal circuit 92, the second correlating interfering signal circuit 94 includes second interference correlation circuitry 104, which receives the in-phase and quadrature-phase digital signals $DIG_I$, $DIG_Q$ to correlate with a second correlating interfering signal of interest, and provides the correlation to a second correlated narrow bandpass filter 106, which provides filtered signals to second correlated signal strength measuring circuitry 108 to measure the signal strength of the correlating interfering signal of interest. Second delay tracking and frequency tracking circuitry 110 creates delay and frequency tracking information. The first and second correlated signal strength measuring circuitry 100, 108 provide the correlated interference signal strength information CISSI to the interference reduction circuitry 80. The first and second delay tracking and frequency tracking circuitry 102, 110 provide correlated interference delay information CIDI and correlated interference frequency information CIFI to the interference reduction circuitry 80.

Figure 8:
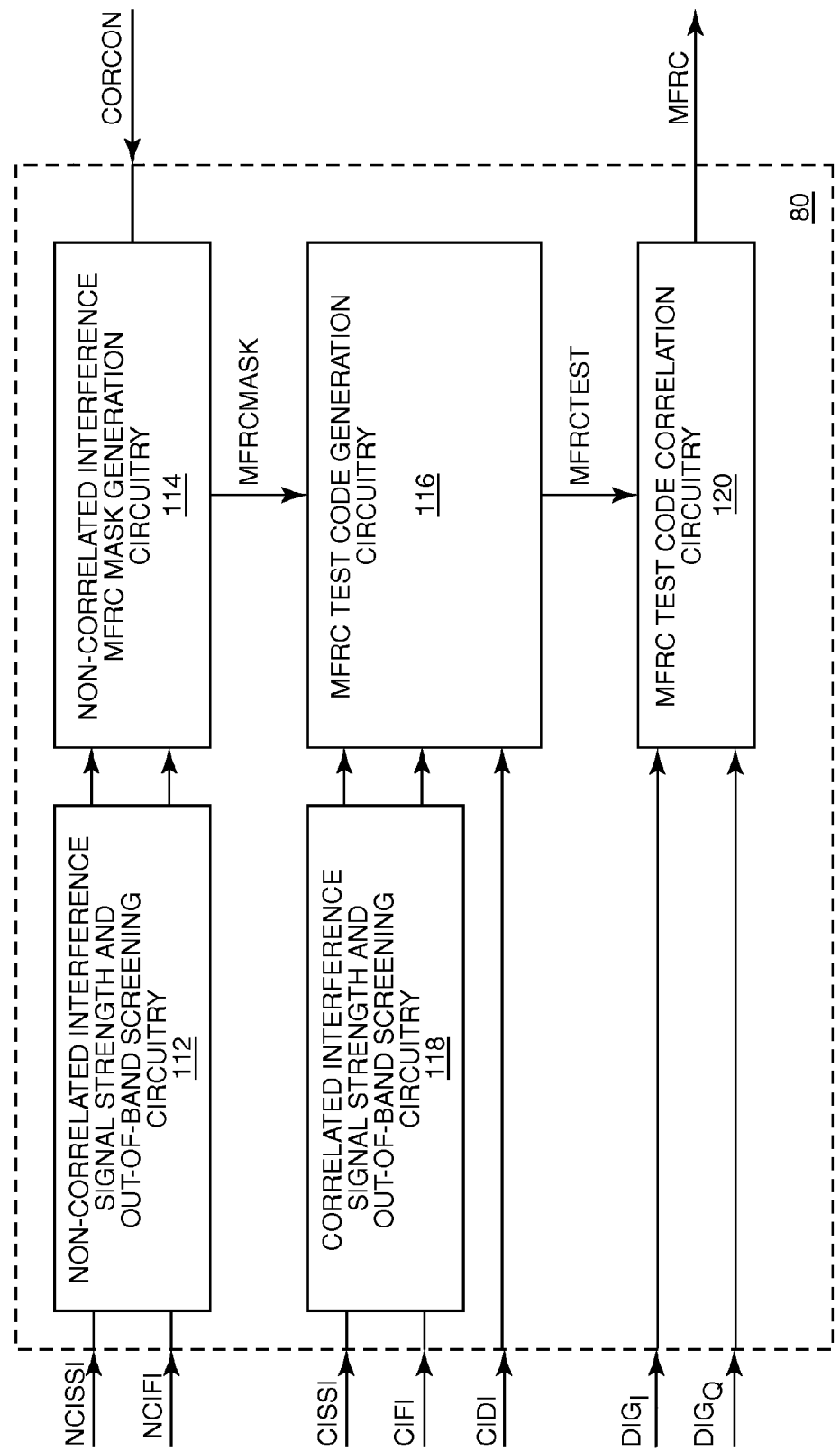
FIG. 8 shows details of the interference reduction circuitry illustrated in FIG. 4.

FIG. 8 shows details of the interference reduction circuitry 80 illustrated in FIG. 4. Non-correlated interference signal strength and out-of-band screening circuitry 112 receives the non-correlated interference signal strength information NCISSI and non-correlated interference frequency information NCIFI, and removes information regarding any interfering signals which are either out of a frequency band of interest or are weak enough to be of no concern. The screened signal strength information and frequency information are fed to non-correlated interference modified first reference code mask generation circuitry 114, which generates a modified first reference code mask MFRCMASK that removes frequencies of the interfering signals of interest. The modified first reference code mask MFRCMASK is provided to modified first reference code test code generation circuitry 116. Correlated interference signal strength and out-of-band screening circuitry 118 receives the correlated interference signal strength information CISSI and the correlated interference frequency information CIFI, and removes information relating to interfering signals that are either outside a frequency band of interest or are weak enough to be of no concern. The screened signal strength and frequency information is fed to the modified first reference code test code generation circuitry 116, which also receives the correlated interference delay information CIDI. The modified first reference code test code generation circuitry 116 uses the screened signal strength information and frequency information, the correlated interference delay information CIDI, and the modified first reference code mask MFRCMASK to develop multiple modified first reference codes that reduce correlations with interfering signals.

Multiple modified first reference codes MFRCTEST are provided to modified first reference code test code correlation circuitry 120, which tests correlations of the multiple modified first reference codes MRFCTEST with the correlated interference signals of interest. The modified first reference code MRFC that best meets test criteria is then selected. The test criteria may include reducing correlations with interfering signals below a specified threshold, maintaining correlations with desired signals above a given threshold, selecting the modified first reference code MFRC that most reduces correlations with interfering signals, or any combination thereof. The multiple modified first reference codes MFRCTEST may be based on a starting modified first reference code, flipping at least one bit of the starting modified first reference code, dividing the starting modified first reference code into multiple groups, flipping at least one bit per group, or any combination thereof. In one embodiment of the present invention, at least one of the multiple groups contains thirty-two bits.

Those skilled in the art will recognize improvements and modifications to the preferred embodiments of the present invention. All such improvements and modifications are considered within the scope of the concepts disclosed herein and the claims that follow.

What is claimed is:

1. A radio frequency (RF) receiver comprising:
an RF mixer adapted to:
receive an RF input signal based on a first reference code, such that the first RF input signal comprises at least one interference signal having interfering frequency content and the at least one interference signal comprises at least one non-correlating interference signal having non-correlating interfering frequency content; and
down-convert the RF input signal with a local oscillator signal to provide a down-converted RF input signal;
an analog-to-digital converter (ADC) adapted to sample the down-converted RF input signal using a sampling clock to provide a sampled input signal;
correlation and filtering circuitry adapted to correlate and filter the sampled input signal by:
mixing the sampled input signal with a modified first reference code to provide a discrete correlation having at least two correlation elements, such that the modified first reference code is based on the first reference code and filtering characteristics, and is further based on the non-correlating interfering frequency content, such that the filtering characteristics reduce effects of the interfering frequency content on a filtered correlation signal; and
summing the at least two correlation elements to provide the filtered correlation signal.

2. The RF receiver of claim 1 wherein the RF input signal comprises a direct sequence spread spectrum (DSSS) RF input signal.

3. The RF receiver of claim 1 wherein the RF input signal comprises a global positioning system (GPS) RF input signal.

4. The RF receiver of claim 1 wherein the first reference code comprises a frequency spreading code.

5. The RF receiver of claim 1 wherein the first reference code comprises a pseudo random noise code.

6. The RF receiver of claim 1 wherein the first reference code comprises a global positioning system (GPS) coarse acquisition (C/A) code.

7. The RF receiver of claim 1 wherein the correlation and filtering circuitry is further adapted to measure the sampled input signal to determine the non-correlating interfering frequency content.

8. The RF receiver of claim 7 wherein the measurement of the sampled input signal comprises a fast Fourier transform (FFT).

9. The RF receiver of claim 1 wherein the at least one interference signal comprises at least one correlating interference signal having correlating interfering frequency content, and the modified first reference code is further based on the correlating interfering frequency content.

10. The RF receiver of claim 9 wherein the correlation and filtering circuitry is further adapted to measure the sampled input signal to determine the correlating interfering frequency content.

11. The RF receiver of claim 10 wherein the measurement of the sampled input signal comprises generation of at least one interference correlation by correlating the at least one correlating interference signal using at least a second reference code.

12. The RF receiver of claim 11 wherein the at least one interference correlation comprises delay information.

13. The RF receiver of claim 12 wherein the at least one interference correlation further comprises frequency information.

14. The RF receiver of claim 12 wherein the correlation and filtering circuitry is further adapted to test a plurality of modified first reference codes such that:
the plurality of modified first reference codes are based on the at least one interference correlation;
a plurality of test correlations are generated by correlating each of the plurality of modified first reference codes with the at least one correlating interference signal; and
the modified first reference code is selected from the plurality of modified first reference codes based on the plurality of test correlations.

15. The RF receiver of claim 14 wherein effects of the interfering frequency content using the selected modified first reference code are less than effects of the interfering frequency content using any other of the plurality of modified first reference codes.

16. The RF receiver of claim 14 wherein effects of the interfering frequency content using the selected modified first reference code are less than a first threshold.

17. The RF receiver of claim 14 wherein a magnitude of a correlation with a desired RF signal using the selected modified first reference code is more than a first threshold.

18. The RF receiver of claim 14 wherein the plurality of modified first reference codes is further based on flipping at least one bit of the modified first reference code.

19. The RF receiver of claim 18 wherein the plurality of modified first reference codes is further based on dividing the modified first reference code into a plurality of groups and flipping at least one bit in each of the plurality of groups.

20. The RF receiver of claim 19 wherein at least one of the plurality of groups contains 32 bits.

21. The RF receiver of claim 1 wherein the correlation and filtering circuitry further comprises computing hardware executing software instructions.

22. The RF receiver of claim 1 wherein a magnitude of a correlation with a desired RF signal using the modified first reference code is more than a first threshold.

23. The RF receiver of claim 1 wherein the modified first reference code contains 1023 bits.

24. The RF receiver of claim 1 wherein:
the at least one interference signal has:
an amplitude below a first threshold; and
the interfering frequency content; and
the filtering characteristics approximately do not reduce effects of the interfering frequency content on the filtered correlation signal.

25. The RF receiver of claim 1 wherein:
the at least one interference signal has:
frequency content outside a desired frequency band; and
interfering frequency content; and
the filtering characteristics approximately do not reduce effects of the interfering frequency content on the filtered correlation signal.

26. The RF receiver of claim 1 wherein the RF input signal comprises a Doppler frequency shift.

27. A method of operation of a radio frequency (RF) receiver comprising:
receiving an RF input signal based on a first reference code, such that the first RF input signal comprises at least one interference signal having interfering frequency content and the at least one interference signal comprises at least one non-correlating interference signal having non-correlating interfering frequency content;
down-converting the RF input signal with a local oscillator signal to provide a down-converted RF input signal;
sampling the down-converted RF input signal using an analog-to-digital converter (ADC) and a sampling clock to provide a sampled input signal;
correlating and filtering the sampled input signal by:
mixing the sampled input signal with a modified first reference code to provide a discrete correlation having at least two correlation elements, such that the modified first reference code is based on the first reference code and filtering characteristics, and is further based on the non-correlating interfering frequency content, such that the filtering characteristics reduce effects of the interfering frequency content on a filtered correlation signal; and
summing the at least two correlation elements to provide the filtered correlation signal.

* * * * *